(12) United States Patent
Wang

(10) Patent No.: US 7,059,370 B2
(45) Date of Patent: Jun. 13, 2006

(54) EXTENSION STRUCTURE FOR TABLE SAW

(76) Inventor: Wang Tien Wang, No. 45, Yi Chang East Rd., Taiping, Taichung Hsien (TW) 411

( * ) Notice: Subject to any disclaimer, the term of this patent is extended or adjusted under 35 U.S.C. 154(b) by 252 days.

(21) Appl. No.: 10/837,597

(22) Filed: May 4, 2004

(65) Prior Publication Data

US 2005/0247372 A1 Nov. 10, 2005

(51) Int. Cl.
*B25H 1/00* (2006.01)

(52) U.S. Cl. .................. 144/287; 144/129; 108/143; 269/289

(58) Field of Classification Search ............... 144/287, 144/129, 286.1, 286.5; 83/477.2, 474, 477; 108/143; 312/334.31, 334.32, 334.33; 269/289
See application file for complete search history.

(56) References Cited

U.S. PATENT DOCUMENTS

| 103,347 | A | * | 5/1870 | Lepp | 83/436.3 |
|---|---|---|---|---|---|
| 2,716,307 | A | * | 8/1955 | Pollard et al. | 108/78 |
| 3,221,677 | A | * | 12/1965 | Kerr | 108/102 |
| 5,526,856 | A | * | 6/1996 | Pedri | 144/287 |
| 5,920,974 | A | * | 7/1999 | Bullen | 29/33 K |
| 5,988,243 | A | * | 11/1999 | Ayala et al. | 144/329 |
| 6,047,750 | A | * | 4/2000 | Jensen | 144/286.1 |
| 6,189,429 | B1 | * | 2/2001 | Liu | 83/477 |
| 6,619,348 | B1 | * | 9/2003 | Wang | 144/287 |

* cited by examiner

*Primary Examiner*—Bena Miller
(74) *Attorney, Agent, or Firm*—Charles E. Baxley

(57) ABSTRACT

An extension structure includes a track, an extension table, and a sliding interface unit. Thus, the extension table can be moved on the track rapidly, easily and conveniently by the sliding guide motion of the sliding interface unit so as to extend the working length of the table of the table saw. In addition, the sliding interface unit has a cheaper price than that of the bearings, thereby decreasing the costs of fabrication of the extension structure. Further, the extension structure is assembled easily and conveniently, thereby facilitating a user mounting the extension structure.

9 Claims, 4 Drawing Sheets

EXTENSION STRUCTURE FOR TABLE SAW

BACKGROUND OF THE INVENTION

1. Field of the Invention

The present invention relates to an extension structure for a table saw, and more particularly to an extension structure, wherein the extension table can be moved on the track rapidly, easily and conveniently by the sliding guide motion of the sliding interface unit so as to extend the working length of the table of the table saw.

2. Description of the Related Art

A conventional extension structure for a table saw is mounted on a side of a table of the table saw and comprises a track secured on a saw base of the table saw, an extension table slidably mounted on the track, and a plurality of bearings mounted between the extension table and the track. However, the bearings are expensive, thereby greatly increasing the costs of fabrication of the conventional extension structure. In addition, it is difficult to mount the multiple bearings between the extension table and the track, thereby causing inconvenience to a user when mounting the conventional extension structure.

SUMMARY OF THE INVENTION

The present invention is to mitigate and/or obviate the disadvantage of the conventional extension structure for a table saw.

The primary objective of the present invention is to provide an extension structure for a table saw.

Another objective of the present invention is to provide an extension structure, wherein the extension table can be moved on the track rapidly, easily and conveniently by the sliding guide motion of the sliding interface unit so as to extend the working length of the table of the table saw.

A further objective of the present invention is to provide an extension structure, wherein the sliding interface unit consists of the columns, the slide plate and rollers having a price cheaper than that of the bearings, thereby greatly decreasing the costs of fabrication of the extension structure.

A further objective of the present invention is to provide an extension structure, wherein the extension structure is assembled easily and conveniently, thereby facilitating a user mounting the extension structure.

In accordance with the present invention, there is provided an extension structure, comprising a track, an extension table, and a sliding interface unit, wherein:

the track has two opposite sides each formed with a first guide channel;

the extension table is slidably mounted on the track and has a bottom face having two opposite sides each formed with a second guide channel facing the respective first guide channel of the track; and the sliding interface unit is mounted between the extension table and the track and includes two first columns each mounted in the respective first guide channel of the track, two second columns each mounted in the respective second guide channel of the extension table, a slide plate located between the extension table and the track, and a plurality of rollers rotatably mounted on the slide plate and located between each of the two first columns and each of the two second columns.

Further benefits and advantages of the present invention will become apparent after a careful reading of the detailed description with appropriate reference to the accompanying drawings.

DETAILED DESCRIPTION OF THE INVENTION

Figure 1:
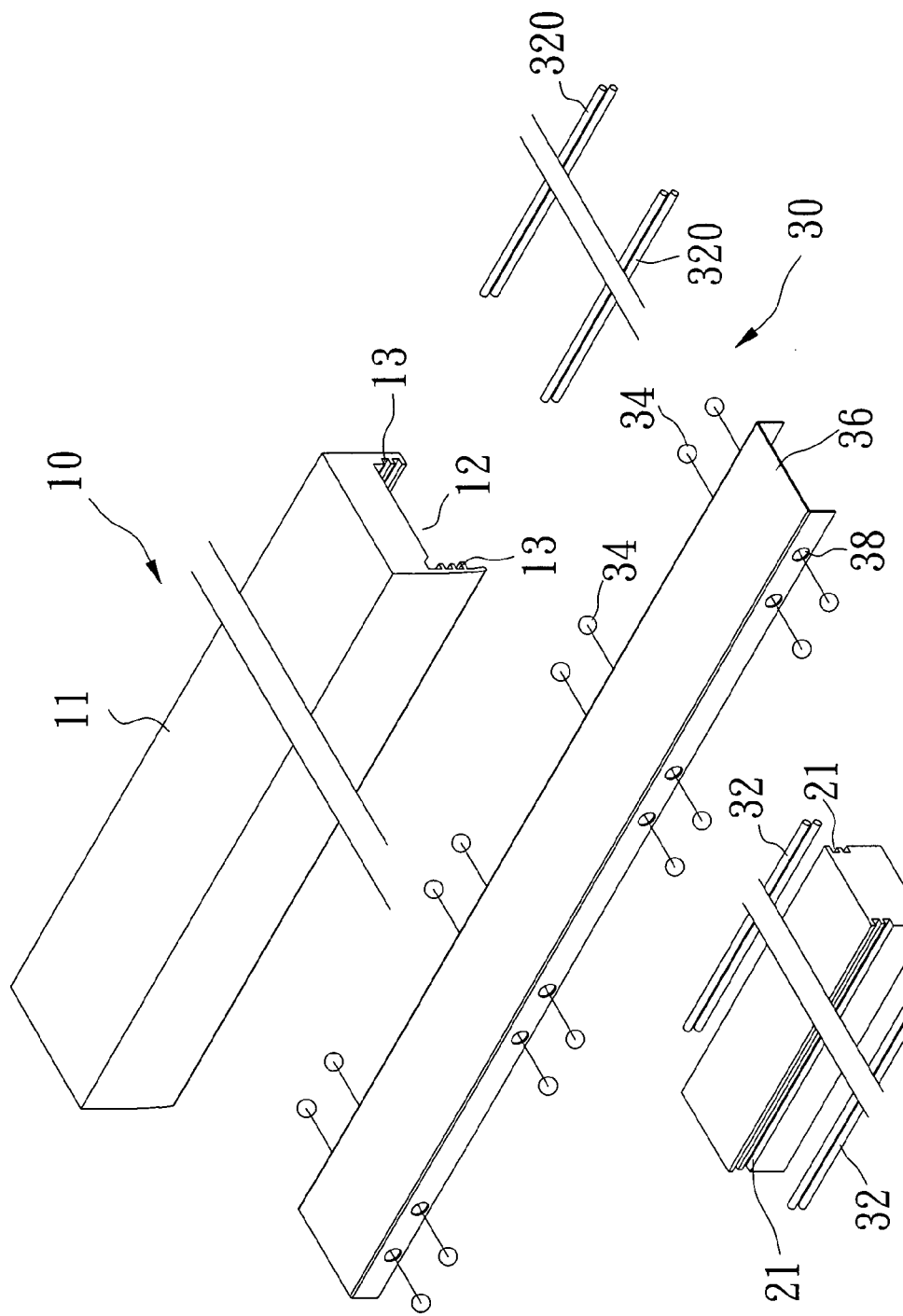
FIG. 1 is an exploded perspective view of an extension structure in accordance with the preferred embodiment of the present invention.
Figure 2:
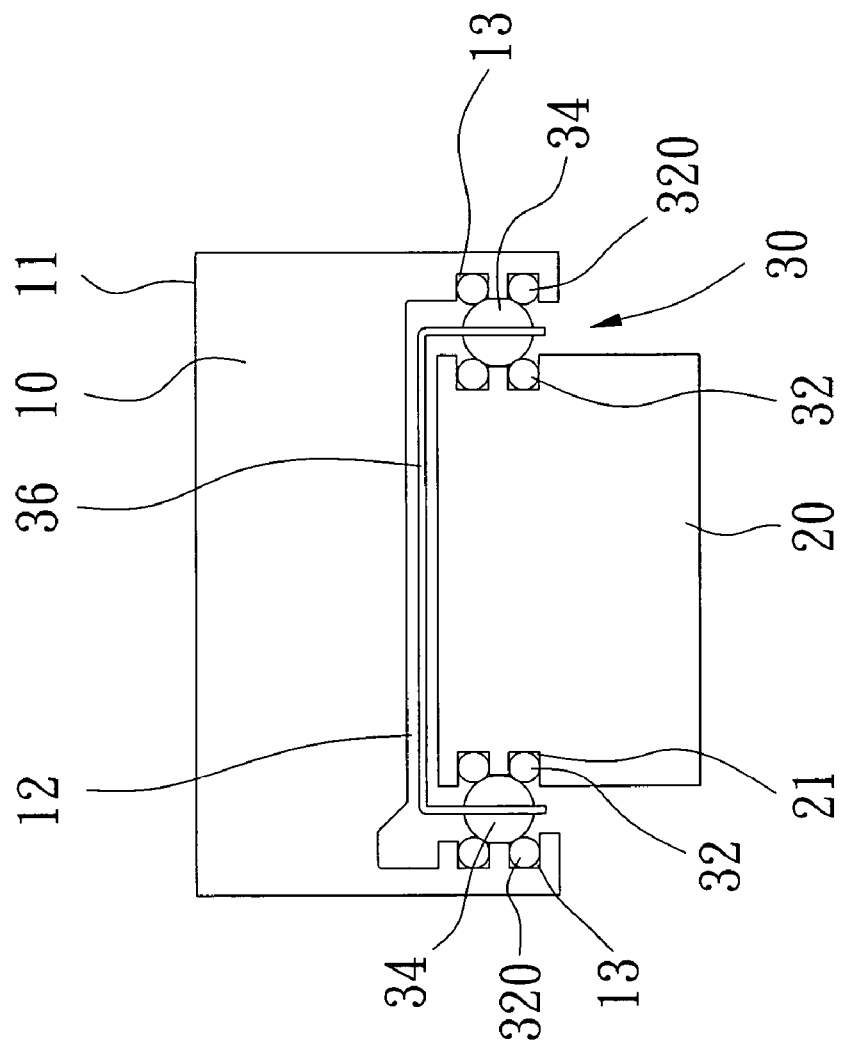
FIG. 2 is a side plan assembly view of the extension structure as shown in FIG. 1.
Figure 3:
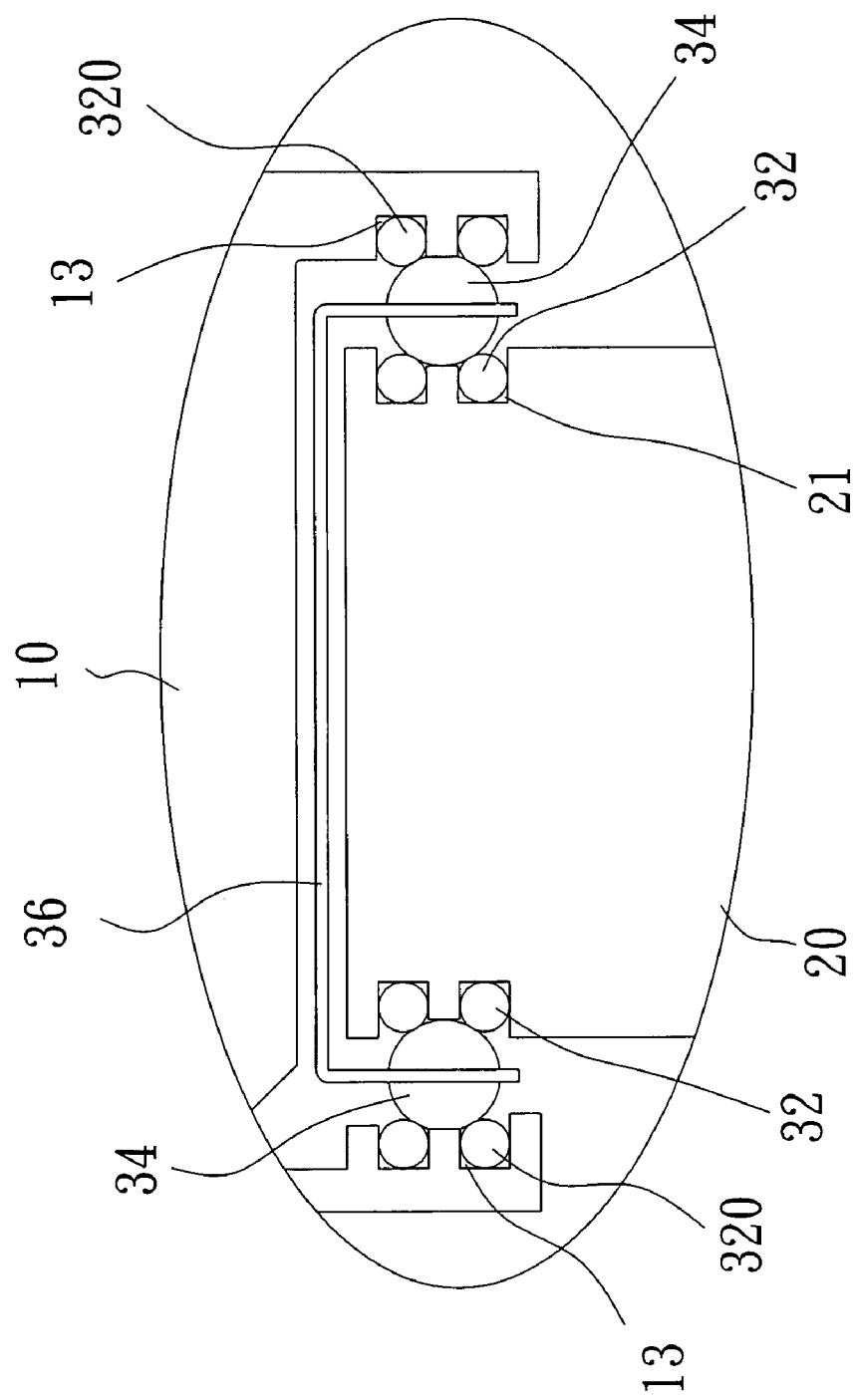
FIG. 3 is a locally enlarged view of the extension structure as shown in FIG. 2.

Referring to the drawings and initially to FIGS. 1–3, an extension structure for a table saw in accordance with the preferred embodiment of the present invention is mounted on a side of a table (not shown) of the table saw and comprises a track 20, an extension table 10, and a sliding interface unit 30.

The track 20 is secured on a saw base (not shown) of the table saw and has two opposite sides each formed with a first guide channel 21.

The extension table 10 is slidably mounted on the track 20. The extension table 10 has a substantially inverted U-shaped cross-section and has a top face formed with a working face 11 and a bottom face having two opposite sides each formed with a second guide channel 13 facing the respective first guide channel 21 of the track 20. The bottom face of the extension table 10 is formed with a receiving chamber 12 for receiving the track 20.

The sliding interface unit 30 is mounted between the extension table 10 and the track 20 and includes two first columns 32 each mounted in the respective first guide channel 21 of the track 20, two second columns 320 each mounted in the respective second guide channel 13 of the extension table 10, a slide plate 36 located between the extension table 10 and the track 20, and a plurality of rollers 34 rotatably mounted on the slide plate 36 and located between each of the two first columns 32 and each of the two second columns 320. Preferably, the rollers 34 are rotatably in contact with each of the two first columns 32 and each of the two second columns 320. The slide plate 36 has a substantially inverted U-shaped cross-section and has two opposite sides each formed with a plurality of mounting holes 38 for mounting the rollers 34.

Figure 4:
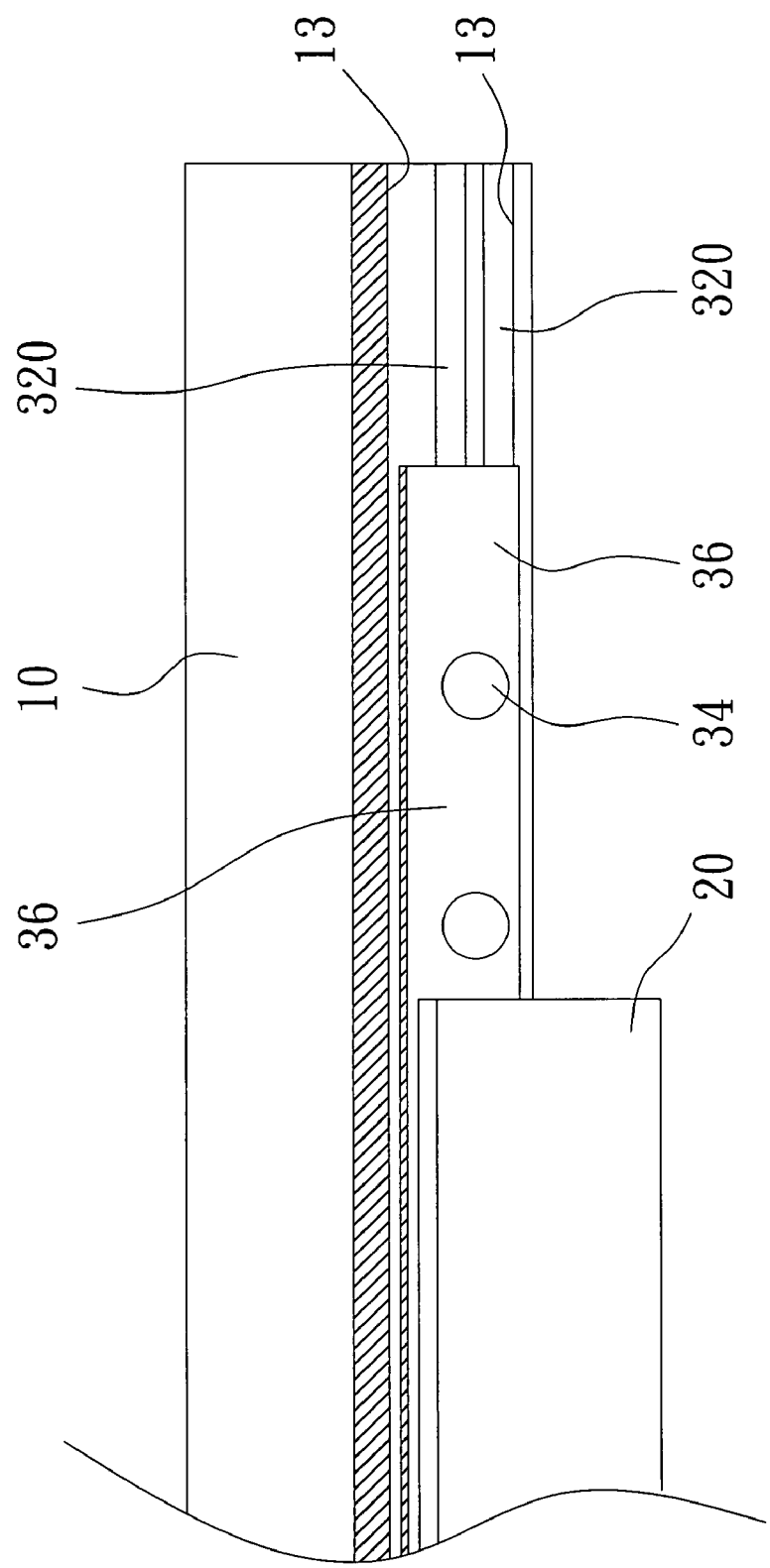
FIG. 4 is a partially cut-away front plan cross-sectional assembly view of the extension structure as shown in FIG. 1.

As shown in FIGS. 3 and 4, the rollers 34 are rotatable between the first columns 32 and the second columns 320, so that the extension table 10 is freely slidable relative to the track 20 by the sliding guide motion of the sliding interface unit 30.

Accordingly, the extension table 10 can be moved on the track 20 rapidly, easily and conveniently by the sliding guide motion of the sliding interface unit 30 so as to extend the working length of the table of the table saw. In addition, the sliding interface unit 30 consists of the columns 32 and 320, the slide plate 36 and rollers 34 having a price cheaper than that of the bearings, thereby greatly decreasing the costs of fabrication of the extension structure. Further, the extension structure is assembled easily and conveniently, thereby facilitating a user mounting the extension structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An extension structure, comprising a track, an extension table, and a sliding interface unit, wherein:
   the track has two opposite sides each formed with a first guide channel;
   the extension table is slidably mounted on the track and has a bottom face having two opposite sides each formed with a second guide channel facing the respective first guide channel of the track; and
   the sliding interface unit is mounted between the extension table and the track and includes two first columns each mounted in the respective first guide channel of the track, two second columns each mounted in the respective second guide channel of the extension table, a slide plate located between the extension table and the track, and a plurality of rollers rotatably mounted on the slide plate and located between each of the two first columns and each of the two second columns.

2. The extension structure in accordance with claim 1, wherein the extension table has a substantially inverted U-shaped cross-section.

3. The extension structure in accordance with claim 1, wherein the extension table has a top face formed with a working face.

4. The extension structure in accordance with claim 1, wherein the bottom face of the extension table is formed with a receiving chamber for receiving the track.

5. The extension structure in accordance with claim 1, wherein the rollers are in contact with the first columns and the second columns.

6. The extension structure in accordance with claim 1, wherein the rollers are rotatably mounted between the first columns and the second columns.

7. The extension structure in accordance with claim 1, wherein the slide plate has a substantially inverted U-shaped cross-section.

8. The extension structure in accordance with claim 1, wherein the slide plate has two opposite sides each formed with a plurality of mounting holes for mounting the rollers.

9. The extension structure in accordance with claim 1, wherein the rollers are rotatable between the first columns and the second columns, so that the extension table is slidable relative to the track by the sliding guide motion of the sliding interface unit.

* * * * *